Aug. 12, 1952 H. H. SCOTT 2,606,972

SYSTEM FOR REDUCING NOISE IN THE TRANSMISSION OF ELECTRIC SIGNALS

Filed Jan. 23, 1946 8 Sheets-Sheet 1

INVENTOR.
Hermon Hosmer Scott
BY David Rines
ATTORNEY

Aug. 12, 1952 H. H. SCOTT 2,606,972

SYSTEM FOR REDUCING NOISE IN THE TRANSMISSION OF ELECTRIC SIGNALS

Filed Jan. 23, 1946 8 Sheets-Sheet 2

INVENTOR.
Hermon Hosmer Scott
BY David Rines
ATTORNEY

*INVENTOR.*
Hermon Hosmer Scott
BY David Rines

ATTORNEY

Aug. 12, 1952 H. H. SCOTT 2,606,972

SYSTEM FOR REDUCING NOISE IN THE TRANSMISSION OF ELECTRIC SIGNALS

Filed Jan. 23, 1946 8 Sheets-Sheet 4

INVENTOR.
Hermon Hosmer Scott
BY David Rines
ATTORNEY

INVENTOR.
Hermon Hosmer Scott
BY David Rines
ATTORNEY

INVENTOR.
Hermon Hosmer Scott
BY David Rines
ATTORNEY

INVENTOR.
Hermon Hosmer Scott
BY David Rines
ATTORNEY

Aug. 12, 1952 H. H. SCOTT 2,606,972

SYSTEM FOR REDUCING NOISE IN THE TRANSMISSION OF ELECTRIC SIGNALS

Filed Jan. 23, 1946 8 Sheets-Sheet 8

INVENTOR.
Hermon Hosmer Scott.
BY David Rines
ATTORNEY.

Patented Aug. 12, 1952

2,606,972

UNITED STATES PATENT OFFICE 2,606,972

SYSTEM FOR REDUCING NOISE IN THE TRANSMISSION OF ELECTRIC SIGNALS

Hermon H. Scott, Lincoln, Mass., assignor, by mesne assignments, to Myron T. Smith, Concord, Mass., trustee Application January 23, 1946, Serial No. 642,961

8 Claims. (Cl. 178—44)

Figure 1:
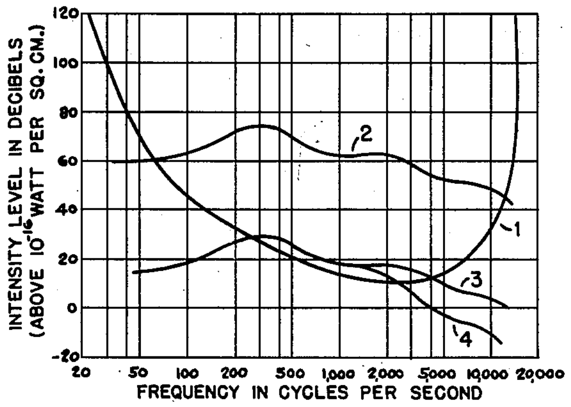

The present invention relates to electric methods and systems, and more particularly to methods of and systems for attenuating or suppressing background noise, interference, and other spurious disturbances during the transmission, the recording, or the reproduction of speech, music, video, and other signals. The term "reducing" or its equivalent will hereinafter be employed generically to include either attenuating or completely suppressing.

Background noise and other extraneous disturbances, at one time or another, are attendant upon practically every form of transmission, recording, or reproducing system. They occur, for example, during the transmission and the reception of the sight and sound channels of television, the presentation of sound-motion pictures, the transmission and reception of signals by wire, telephone, cable, or radio, in relay circuits, and in the reproduction of all types of recording. They have heretofore been attenuated at the expense of seriously impairing the fidelity with which the desired signals have been transmitted. The customary practice has been to restrict the frequency range of the system so as to provide what has been considered to be the best compromise between the fidelity of the transmission and the suppression of the noise. The compromise has not, however, been satisfactory.

To take an illustration from phonographic-record reproduction, the interference has consisted very largely of the annoying surface noises caused by the scratch of the stylus or needle. These scratch noises usually accompany the high-frequency components only of the reproduced speech or music, which high frequencies comprise mainly harmonics of the lower frequencies. In recognition of this fact, the compromise proposed was the elimination of these high frequencies altogether. This, however, resulted in serious effects upon the brilliance, balance, and the naturalness of the music.

The restriction upon the fidelity of the reproduction was particularly noticeable at the high-volume or high-intensity levels of the reproduced signal; at the low-intensity levels, the human ear does not seem to notice the absence of the high-frequency components of sound. As, moreover, the spurious noises are very effectively masked, so as to be nearly or quite imperceptible to the human ear, when the speech or music reproduced by the phonograph record is loud, it was proposed to attenuate the high-frequency components at the low-volume levels only; and to permit reproduction of the high-frequency range at the high levels, either of the high-frequency components themselves, or of the reproduced signals as a whole.

This modification of the originally proposed compromise, however, can be practically availed of only when the desired high-frequency-signal components are at a high level compared to the noise components, or are accompanied by medium-frequency components of substantial volume or intensity. What is meant by "medium-frequency components" in this specification will be explained hereinafter. When these loud medium-frequency components are present, as before stated, the ear does not notice the high-frequency-noise components. The proposed modification cannot be availed of generally, therefore, when the response to the high frequencies is unaccompanied by a signal at medium frequencies of substantial level.

In these previously proposed systems, high-level high-frequency interference signals have been reproduced without any attenuation thereof, because their very presence allows the system to reproduce the high-frequency ranges. Systems depending for their effectiveness upon control in accordance with the level in the high-frequency range are fundamentally defective in that the greater portion of the control may be exercised by the noise-frequency components themselves, if the noise level is high enough. This permits of reproduction in the high-frequency range with accompanying spurious noise, when the level of the desired signal is low; and particularly so when there is no desired signal at all to be reproduced in that high-frequency range other than the undesired noise. During such periods of silence of the desired signal, even between notes in musical phrases, the high-frequency scratch is very annoyingly heard, and it is all that is then heard. It is very desirable to attenuate the very audible needle scratch that may accompany that music silence. The same considerations apply, however, even in periods of non-silence, where the volume level of the reproduced music contains no loud medium-frequency components, and when most of the high-frequency musical components exist only at levels too low to be heard.

In copending applications, Serial Nos. 641,673 and 642,411, filed January 17, 1946, and January 19, 1946, respectively, the problem of eliminating these spurious noises is solved by a novel method of attenuating the high-frequency components of the signals. Each of the said applications disclosed both variable-filter and variable-amplifying means for attaining the desired results, but specifically claiming the filter means only.

The present application is filed in order to claim specifically the variable-amplifier embodiment of the invention. The amplifier invention may, however, be employed also in connecton with the filter inventions of the said applications.

It is accordingly an object of the present invention to provide a new and improved method of and system for reducing background noise or other interference during transmission, recording, reproduction, and the like, that shall retain practically a high degree of apparent fidelity.

To the attainment of this end, a feature of the invention resides in reducing the response in the high-frequency region, not in accordance with the level of the higher frequencies, and not in accordance with the level of all the frequencies as a whole, as has heretofore been proposed, but rather in accordance with the level of some or all of the medium, or some or all of the low frequencies, or the frequencies below the range of the high frequencies that are being controlled, or both types of frequencies. The noise is suppressed when the level of these medium or low frequencies is so low that the signal cannot mask the noise; or so low as to indicate that any probable level of the higher frequencies, insofar as the desired signal is concerned, is below the threshold of hearing. The noise is thus reduced at low-volume levels by reducing the range of the high-frequency overtones that are not normally heard by the ear except at the high-volume levels. Better suppression of noise, with less effect upon the reproduction of the higher treble tones, and with no apparent decrease in the quality of reproduction, is thus attained. If the signal is such that the level of the low-frequency components is high compared to that of the high-frequency components and, particularly, the noise components, the described operation, of course, takes place when the level of the signal as a whole falls below a predetermined level.

Though the example above has been given, for illustrative purposes, in connection with the spurious noises attendant upon the high-frequency components of the signals coming from a phonograph record, the invention is not limited to such use. The invention is of general applicability. It may be used to advantage to reduce the noise attendant upon the reproduction of practically any type of system involving recordings made upon wax, discs, tapes, films, wires, etc. It may be used also to reduce various types of interference common in radio-broadcasting, such as adjacent-channel interference, frequently called "monkey-chatter," heterodyne whistles, the effects of atmospheric and other disturbances, and in any other application where noise is a factor. It is equally useful at audio, video, and other frequency ranges.

The low and the medium frequencies are not suppressed or altered in the process of eliminating the high-frequency components of the signals at the low-volume levels. Though thus effectively eliminating the spurious noise, therefore, the elimination of the high-frequency components may, under some conditions, if audible components are in any way affected, result in loss of apparent brilliance of the reproduced signal, and in a loss of balance or symmetry between the high-frequency and the low-frequency responses.

This may be understood by considering, for example, audio-frequency music signals, the relative balance of which is referred to as aural balance. Aural balance may be defined as the ratio of the audible energy in the treble notes to the audible energy in the base notes; or the ratio of the reproduced high and low frequencies. Those components only of the energy are taken into account, in this ratio, as are of such frequency and amplitude as to correspond to audible tones at the particular levels at which they exist.

Another object of the present invention is to provide a new and improved method of and system for reducing or suppressing background noise or other interference of this character accompanying the low-frequency components of the signals. These may, for example, in music, include mainly the range of bass fundamentals, below about 250 cycles, say, in the region where the human ear is relatively insensitive at low levels.

Since such low frequencies are seldom present in music except when accompanied by harmonics residing in the medium-frequency or the higher-frequency regions, this control may be effected in accordance with the level of the medium or the high frequencies.

It has been explained that systems eliminating high-frequency noise, through control by high frequencies, are unsatisfactory. For the same reasons, control of the low-frequency responses, to eliminate undesirable low-frequency noise, by the low frequencies is unsatisfactory. Such would result in the reproduction of undesired loud low-frequency noises, even though no desired signal may be present. The elimination of the low-frequency noises may similarly result in destruction of the aural balance, this time resulting from the attenuation near the low-frequency limit of the useful frequency range.

Any modification of the reproduction of either the treble or the base notes, for a particular level of reproduction, may produce an obvious change in the aural-balance-ratio relationship of the reproduced high and low frequencies. This may become noticeable to the ear as an apparent change in balance, tending to make the reproduction either high-pitched or low-pitched, resulting either in an unduly brilliant or an unnaturally dull or "boomy" quality, depending upon whether the attenuation is more effective at the low or the high frequencies. This is particularly annoying to music-lovers, and tends to obscure fine details in music.

In prior-art systems, the operation of the noise-suppressing means has been accompanied by a shift of the balance between the high and the low frequencies that is often very noticeable to the ear and renders the presence of the noise-suppressing system apparent even when its operation is otherwise satisfactory.

If the same listener always heard the program over the same range of levels, and the orchestra always produced exactly the same spectrum, it would be a simple matter to determine what frequency ranges could be attenuated or suppressed, without affecting the quality noticeably. In any practical application, however, many variations prevail. The usual type of signal, for instance, does not remain constant. All listeners, again, do not have equal acuity of hearing. The total sensitivity of the system, from microphone to loudspeaker, moreover, may be varied, or the volume range of the program may be contracted, thus changing the range of listening levels. These factors may result in a condition where, sometimes, the transmitted frequency range of the music is less than the range of the components that would be perceived by the ear. This would impart an unnaturally low-pitched or high-pitched quality to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear.

Another object of the present invention, therefore, is to provide a novel method of and system for maintaining a substantially constant balanced relationship between the volume levels of the high and the low frequencies.

Another object of the invention is to provide a novel method of and system for maintaining a substantially constant apparent frequency range in reproduced music and other applications, though actually restricting the range under conditions where noise would be troublesome.

This is especially desirable in practical systems involving the reproduction of music where a change in the balance may be objectionable, particularly if the modification seems to vary with the volume level of the sound. The aural balance between the energy in the treble notes and the energy in the bass notes obtained in accordance with the present invention yields a high degree of apparent fidelity such as to satisfy the ear, even under conditions where frequencies within the audible range for the particular level to be reproduced are attenuated to a degree that would otherwise be noticeable. This allows greater suppression of noise with less noticeable effect upon musical quality than in prior-art systems.

To the attainment of the above ends, a further and important feature of the invention resides in the simultaneous control of both the high and the low frequencies or, alternatively, the introduction of a predetermined amount of resonance into the response of the system when the range is restricted, or a combination of both methods. Although the frequency range may be restricted, under some conditions, relative to other conditions, the relative balance between the high and the low frequencies, or the high and low musical tones, is nevertheless maintained substantially constant, and both high-frequency and low-frequency noises may be reduced. The reproduction of transients, as judged by the ear, tends also to be improved.

The maintenance of constant aural balance so greatly improves the operation that, in general, the only noticeable effect of the use of the noise-suppressing system is the desired effect, namely, the suppression of noise. It also increases the flexibility of the system with regard to the type of signal, listening conditions, etc.

The desired ends may be attained, in accordance with another feature of the invention, by suitably varying the characteristics of suitable amplifying means.

In accordance with a feature of this invention, better suppression of noise is obtained, with no apparent decrease in the quality of reproduction, not only insofar as the high frequencies, but also insofar as the low frequencies, are concerned.

Other and further objects will be explained hereinafter, and will be more particularly pointed out in the appended claims.

Figure 2:
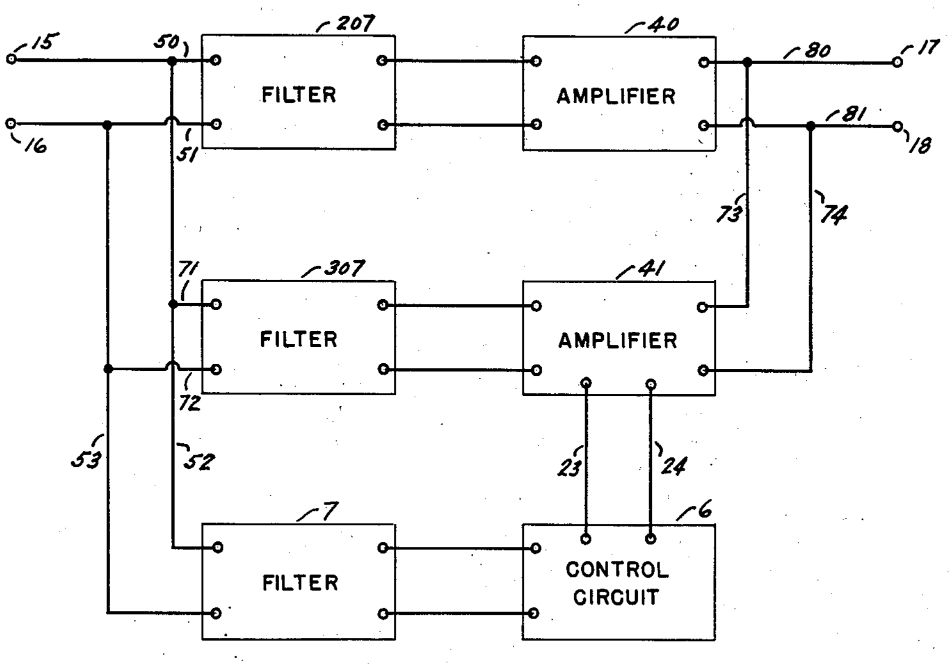
Figure 3:
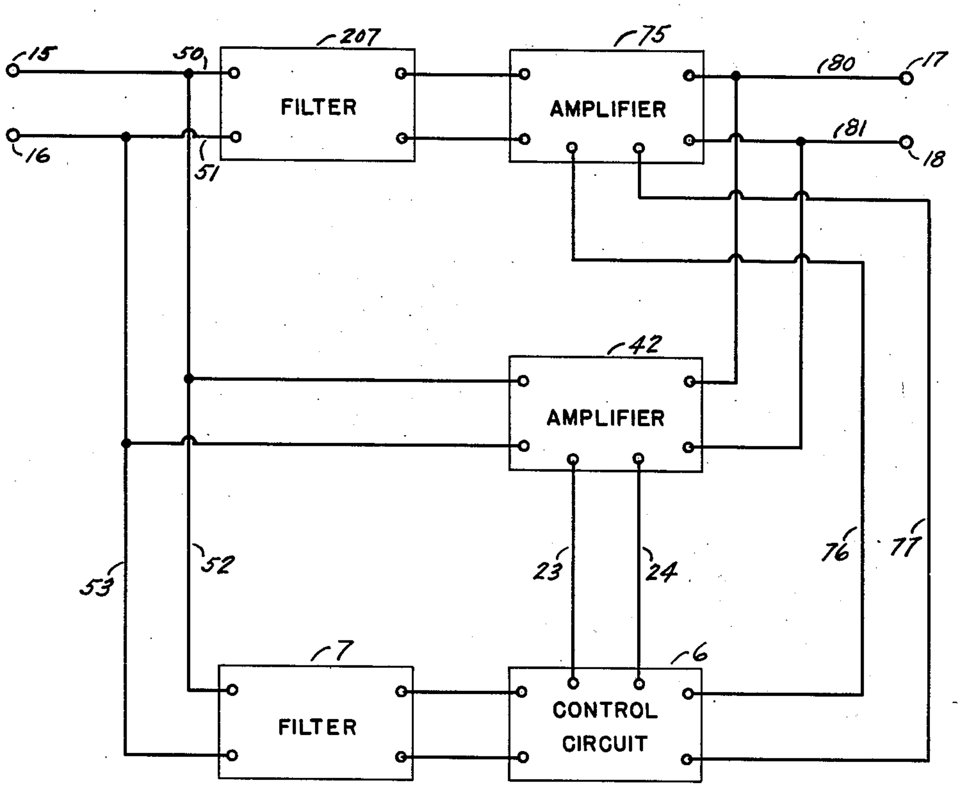
Figure 4:
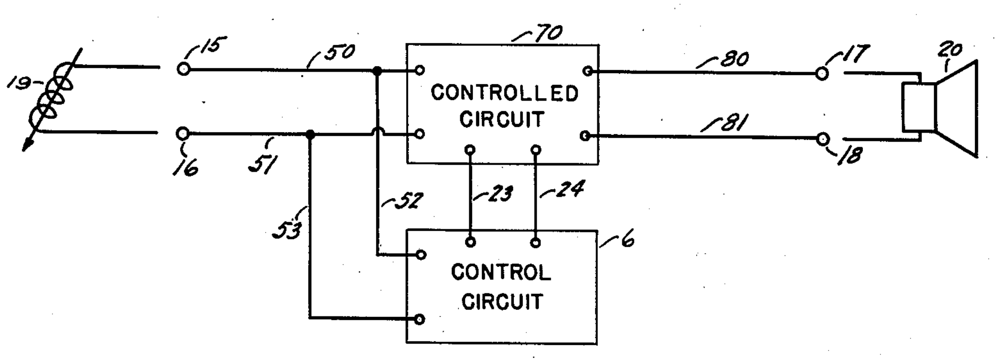
Figure 5:
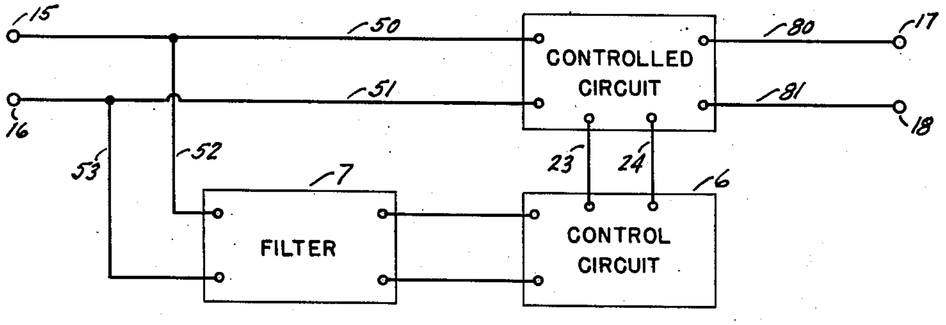
Figure 6:
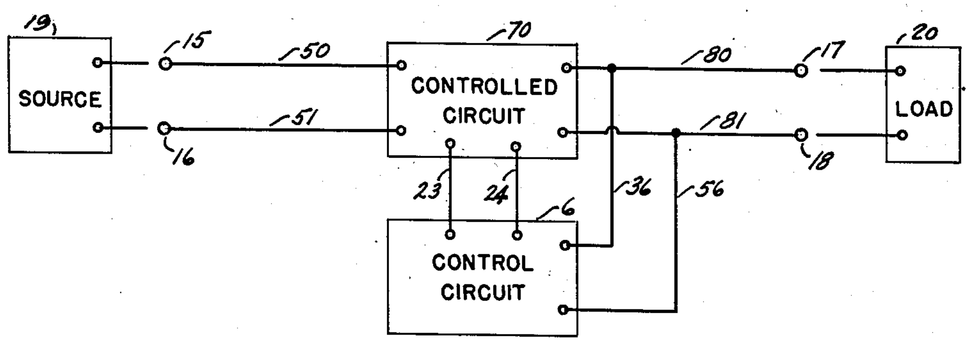
Figure 7:
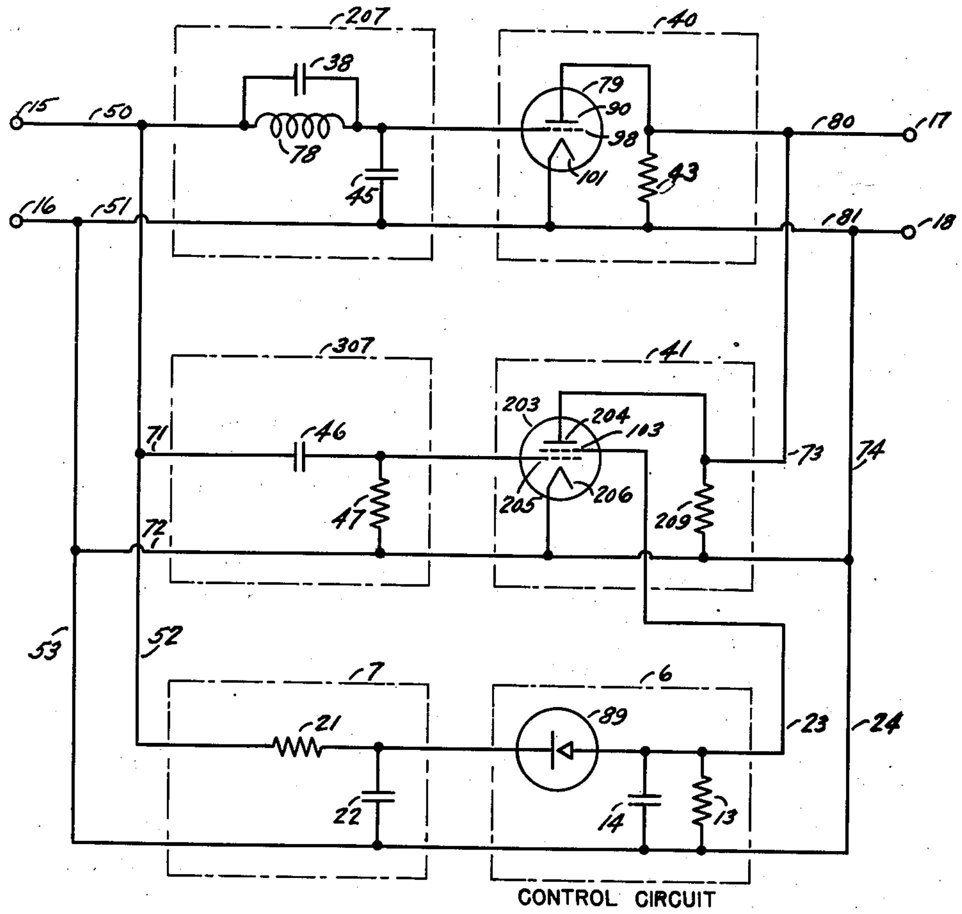
Figure 8:
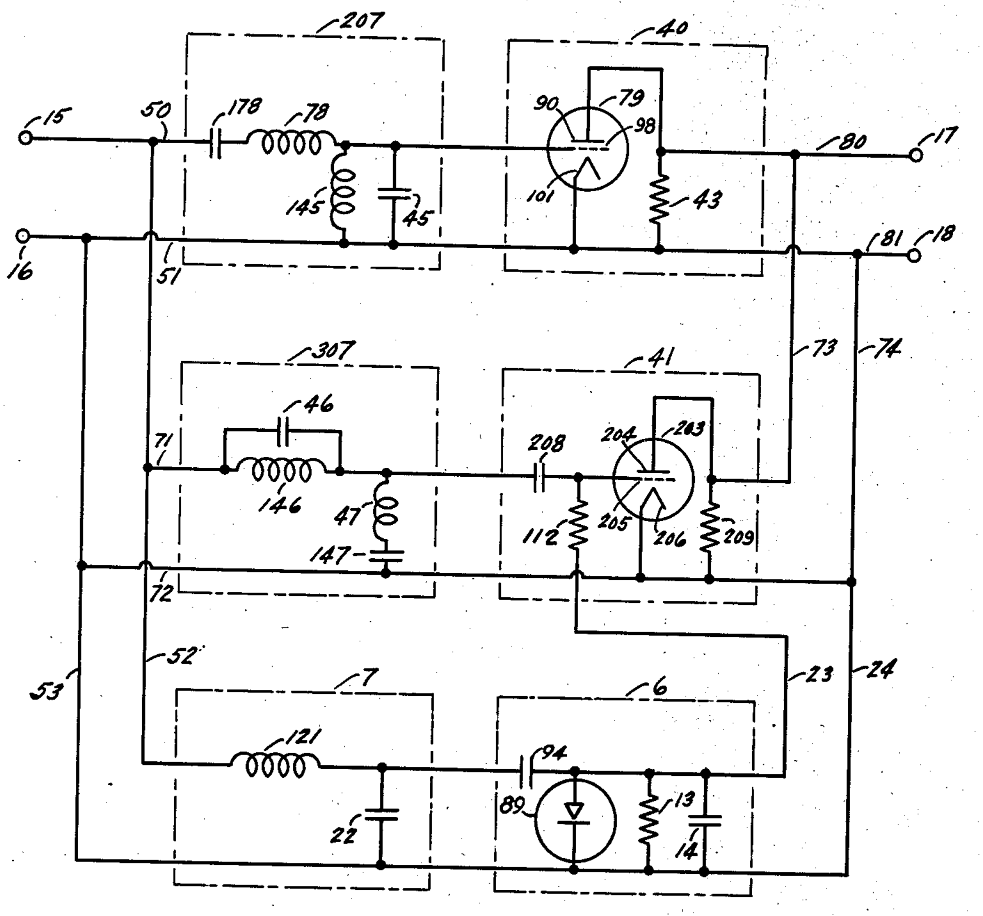
Figure 9:
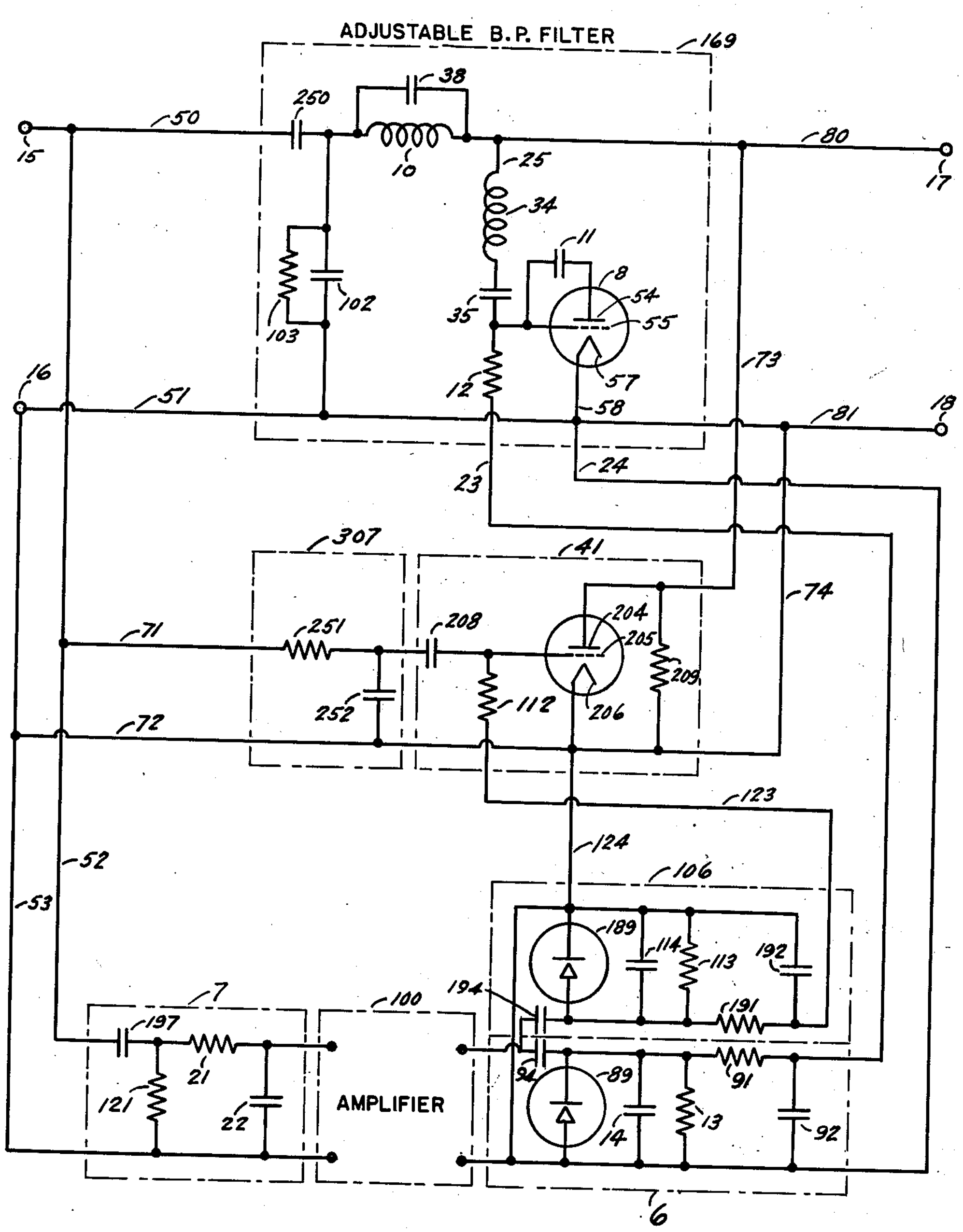
Figure 10:
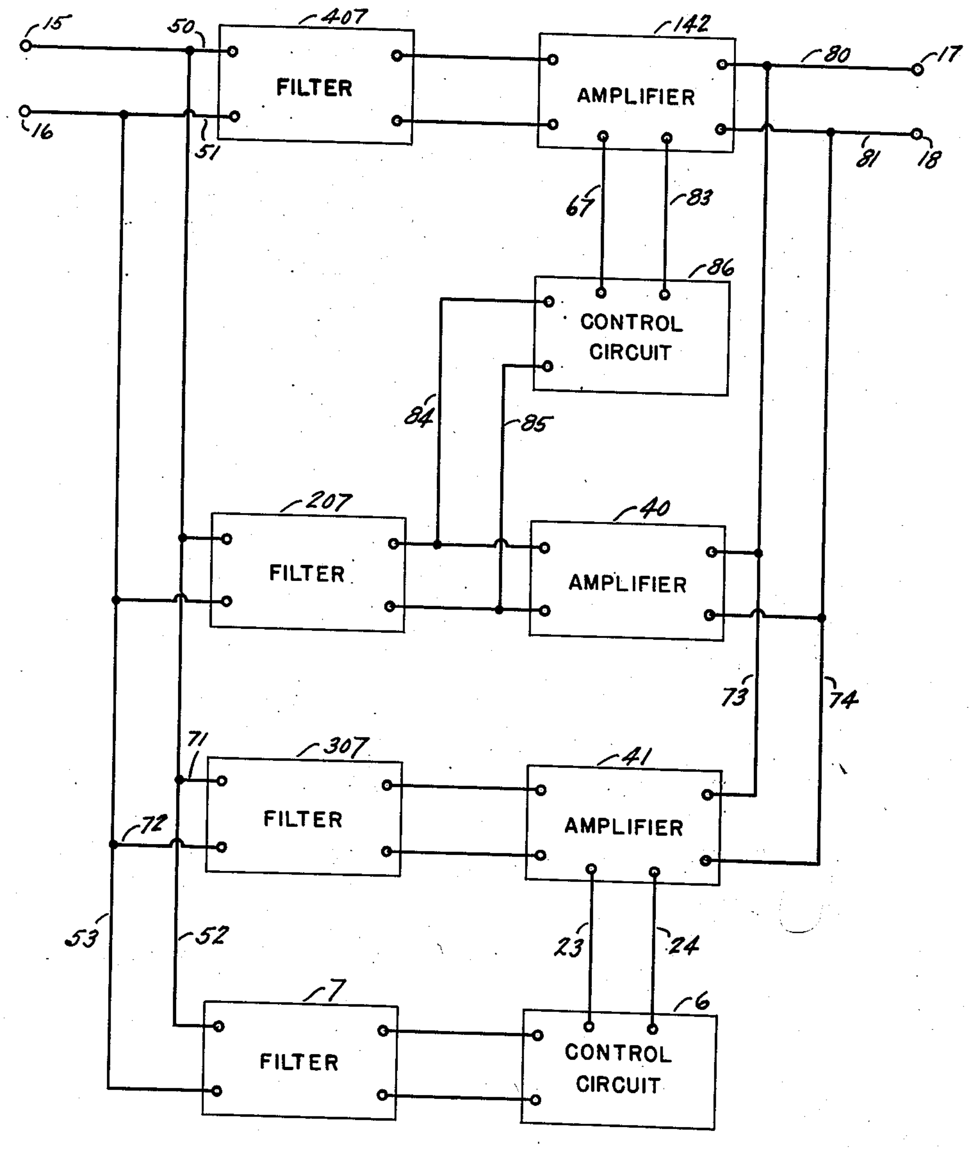
Figure 11:
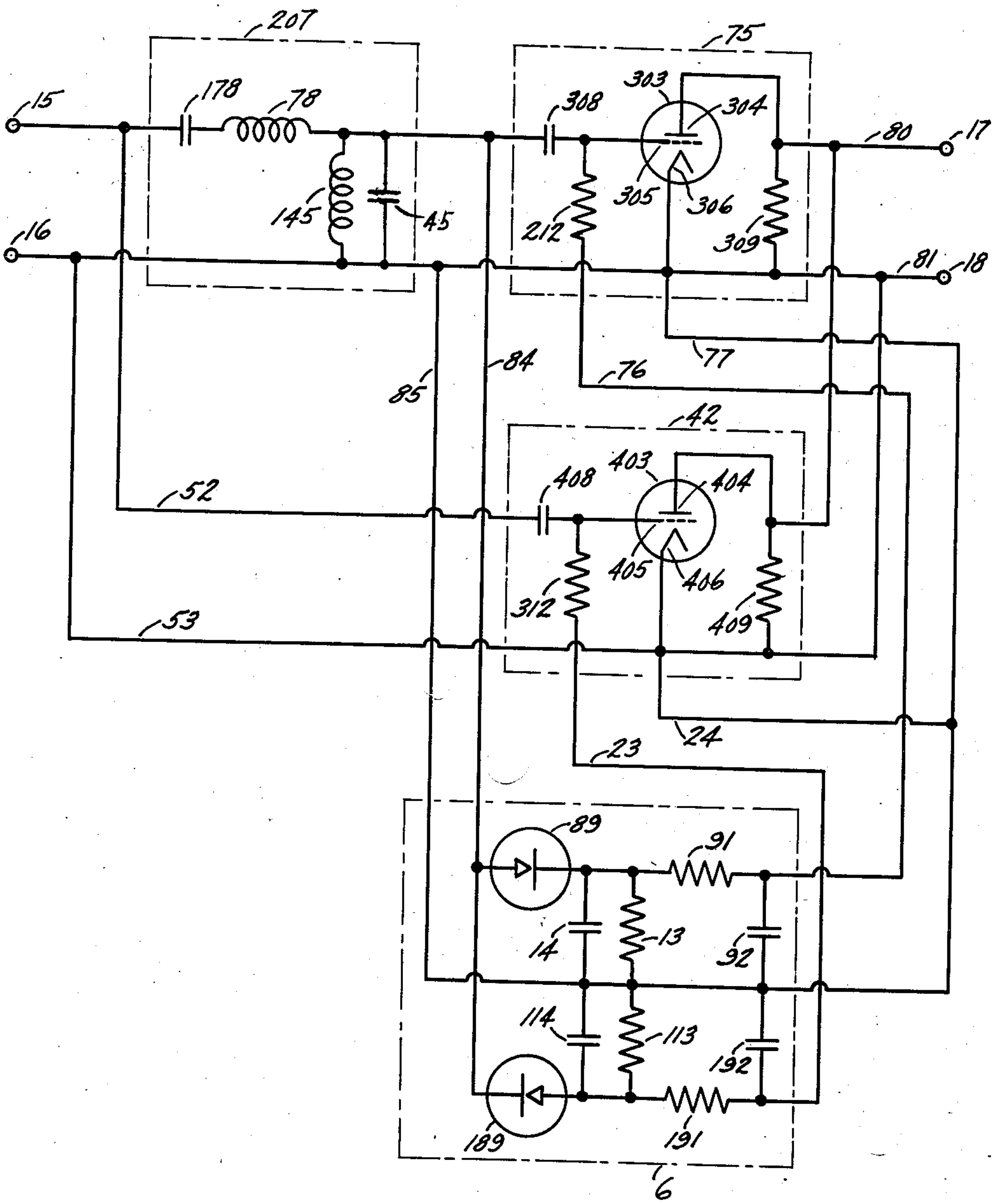

The invention will now be more fully explained in connection with the accompanying drawings, in which Fig. 1 presents a series of graphs representing the frequency-response characteristics of the human ear, and the relative amplitudes and frequencies of the various components present in a typical signal, such as orchestral music, the abscissae being plotted logarithmically in terms of cycles-per-second frequency, and the ordinates being plotted arithmetically, in terms of decibel intensity units; Fig. 2 is a block-diagram view of a typical system embodying the present invention and representative of the circuits and apparatus of Figs. 7 and 8; Fig. 3 is a further modification of Fig. 2; Fig. 4 is a view representative of an alternate method of connecting the control circuit in the systems of all of the figures except Fig. 1; Fig. 5 is a view representative of all the other figures except Fig. 1; Fig. 6 is a similar view of a modification; Fig. 7 is a diagrammatic view of circuits and apparatus embodying the form of the invention illustrated in Fig. 2 and showing actual typical circuit elements; Fig. 8 is a similar view of a modification; Fig. 9 is a similar view of a form of the invention combining a variable amplifier and a variable filter; Fig. 10 is a view similar to Fig. 3 of a further modification; and Fig. 11 is a view showing a typical circuit configuration similar to Fig. 3.

Though the method and system described herein are applicable wherever the degree of perception of the signal-receiving means varies with the characteristics of the signal, and wherein balance between the high and the low frequencies, or two bands of frequencies, is important, the invention, for concreteness, will be explained as it applies to a typical application, namely, the reproduction of music and similar signals by a phonograph or a radio.

From the curve 1 of Fig. 1, representing the threshold of hearing-sensitivity for an ordinary human ear, it appears that the ear is most sensitive in the region around 2,000 cycles, and that the sensitivity falls off rapidly at both lower and higher frequencies.

The curve 2 may be considered to be representative of the energy-distribution characteristics, as a function of frequency, of typical orchestral music at a particular level. When shifted along the axis of ordinates, to correspond to changes in the volume or intensity of the sound, as in response to a volume control or an attenuator, it intersects the threshold curve 1 at points representing different frequences. These points represent the limits of the frequency range necessary to reproduce satisfactorily for the listener the particular type of signal at the particular volume or intensity levels. If the level of the curve 2 is reduced equally throughout the range, for instance, to occupy the position of the curve 3, the necessary or perceptible range of frequencies is seen to become accordingly restricted, from about 70 cycles to about 250 cycles at the low-frequency portions of the curves 2 and 3, respectively, and from 12,000 cycles to about 4,000 cycles at the high-frequency portions of the curve 3. If the music or other signal should have frequency components outside these ranges, they would not be audible.

Most musical instruments, when played softly, moreover, produce a mellower tone than when played loudly, thus indicating the presence of fewer harmonics or overtones falling within the higher-frequency ranges. While the curve 2, as before stated, may become transformed into the curve 3 when the sensitivity of the transmission means is reduced, therefore, it may actually become transformed into the still lower curve 4 if the reduction of volume or intensity is caused by the orchestra playing more softly. The lower curve 4 shows that the before-mentioned low-level limit of 4,000 cycles may thus become reduced to about 2,500 cycles or less when the orchestra is playing softly; the greater portion of the audible energy is below this 2,500-cycle value. Since most music, by its very nature, covers an appreciable volume or intensity range, this characteristic offers the further advantageous feature, therefore, that it allows further restriction of the frequency range of the transmission equipment at low-volume or low-intensity levels, from about 4,000 cycles to about 2,500 cycles, without seriously impairing the quality, as perceived by the ear. A similar situation exists for speech and vocal music.

The suppression of noise according to the present invention is based upon these and similar factors.

The curves 2 and 4 may, therefore, be regarded as representative of typical signals involving high and low volume or intensity levels, such as may be encountered in the reproduction of music and similar signals, the curve 2 being at an average volume or intensity level of, say, 63 decibels in the region around 1,000 to 2,000 cycles, which contributes most to the loudness as heard by the ear, and the curve 4 at a volume or intensity level of approximately 18 decibels in the same range. The points where the curves 2 and 4 cross the curve 1, at 70 and 12,000 cycles for the curve 2, and 250 and 2,500 cycles for the curve 4, respectively, represent the ranges necessary to reproduce these particular signals satisfactorily at these levels.

When the orchestra plays loudly, it is desirable to reproduce, insofar as the rest of the system is capable of so doing, the entire range of high, medium and low frequencies, from about 70 cycles to about 12,000 cycles; otherwise, the reproduction will fail to include some of the audible components of the music signal represented by the curve 2. When the orchestra plays softly, however, the medium-frequency range of from about 250 to 2,500 cycles is all that is needed, as demonstrated by the curve 4; frequencies below 250 cycles and all the frequencies above about 2,500 cycles may then be eliminated without any serious effect upon the reproduced music. At intermediate levels, of course, intermediate ranges are required.

If the system, through other limitations, is not able to reproduce satisfactorily the entire range up to 12,000 cycles, it may be possible, at low levels, to restrict the high-frequency range to a limit considerably lower than 2,500 cycles, at low levels, without further noticeably impairing the quality of reproduction as compared with high levels.

If the transmitted range of the music is less than the range of the components that would be perceived by the ear, an unnaturally low-pitched or high-pitched quality would be imparted to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear under conditions varying from the exact conditions as typified by the curves of Fig. 1.

As before indicated, one of the objects of the present invention is to maintain the apparent quality of reproduction approximately constant, even though the signal and other conditions should vary somewhat from those represented by the curves of Fig. 1.

Referring now to Fig. 4, when an input signal, as from a phonograph pick-up, a radio-receiver, or another source 19, is applied to the input terminals 15 and 16, it is transmitted, by input-lead conductors 50 and 51, through a controlled circuit 70, and by way of output-lead conductors 80 and 81, to the output terminals 17 and 18. These may be connected to any output load 20, such as a loudspeaker, an amplifier, or a radio transmitter.

The controlled circuit 70 may, for example, be the amplifiers 40 and 41 of Figs. 2, 7, and 8, the amplifiers 75 and 42 of Fig. 3, the amplifiers 40, 42 and 142 of Fig. 10, or the amplifier 41 and the wave filter 169 of Fig. 9. The various transmission paths provided by the amplifiers 40 and 41 of Figs. 2, 7, and 8, the amplifiers 75 and 42 of Fig. 3, the amplifiers 40, 41, and 142 of Fig. 10, and the amplifier 41 and the wave filter 169 of Fig. 9 are respectively connected in parallel. The input of the amplifier 40 of Figs. 2, 7, and 8 and the amplifier 75 of Fig. 7, for example, is shown connected to the input terminals 15 and 16 by the conductors 50 and 51, through a filter 207, and its output is connected to the output terminals 17 and 18 by the conductors 80 and 81. The input of the amplifier 41 of Figs. 2, 7, 8, and 10, similarly, is shown connected to the conductors 50 and 51 by input conductors 71 and 72, through a filter 307, and its output to the output conductors 80 and 81 by output conductors 73 and 74. The pick-up 19 and the loudspeaker 20 are shown symbolically as typical source and load, and may be provided with amplification and the like, where necessary.

Most treble tones, or high musical fundamentals, lie below the typical high cut-off frequency of about 2,500 cycles, and are of the medium frequencies before mentioned. For the larger part, the relatively high frequencies that are attenuated in accordance with the present invention are the harmonics or overtones of these treble fundamentals plus a few extremely high treble fundamentals constituting a small portion only of the total energy in the music.

The amplifier 40 of Fig. 7, for example, which embodies a practical circuit of the type shown in Fig. 2, is of the fixed type, having a limited or restricted frequency range, such as up to 2,500 cycles. The amplifier 41 is of the variable-gain type, covering ranges above and below these predetermined limits, and it is rendered operative by the control circuit 6 and its associated, hereinafter more fully described filter 7 (if employed) only when the applied signal is sufficiently strong. It therefore reproduces the high-frequency components beyond the normal range of the fixed amplifier 40 under the control of the level of the signal.

The signals are thus passed through two transmission paths or channels represented by the amplifiers 40 and 41. The transmission characteristics of one of the transmission paths are so determined by filter or other components as to include frequency ranges normally attenuated in the other path, but desirable for the reproduction of high-level sounds. If one of the paths is high-pass, for example, the other is low-pass; and if one path is band-pass, the other may be band-elimination. In the system of Fig. 7, the filter 207 associated with the amplifier 40 is low-pass, and the filter 307 associated with the amplifier 41 is high-pass. In the system of Fig. 8, the filter 207 is band-pass and the filter 307 is band-elimination.

In the system of Fig. 7, the filter 207 associated with the amplifier 40 is shown low-pass, and the filter 307 associated with the amplifier 41 is shown high-pass, for the control of high frequencies only. This filter 207 is connected, in any desired manner, to the input circuit of the vacuum tube 79 of the amplifier 40. The filter 207 of Fig. 7 typically comprises a series inductor 78 shunted by a condenser 38, and a shunt condenser 45, providing an m-derived half section giving sharp cut-off at, say, 2,500 cycles and high attenuation above cut-off. By proper choice of the operating impedances for the filter 207 a predetermined amount of resonance may be introduced into the circuit to increase the amplitude of transmission or lengthen the duration of transients at frequencies near the cut-off frequency, thus to improve aural balance. The filter 307 is of a simpler type, comprising a series condenser 46 and a shunt resistor 47. The filter 307 transmits mainly frequencies above the cut-off of the filter 207. In the system of Fig. 8, however, the filter 207 is shown comprising a condenser 178 in series with the inductor 78, and an inductor 145 in parallel with the capacitor 45, and the filter 307 is shown provided with a series arm comprising a parallel-connected inductor 146 and capacitor 46 and a shunt arm comprising a series-connected inductor 47 and capacitor 147. In the system of Fig. 9, the filter 307 is shown constituted merely of a series resistor 251 and a shunt capacitor 252.

The series arm of the filter 207 is shown connected to the control grid 98 of the vacuum tube 79 of the amplifier 40. A resistor 43, connected between the anode 90 and the cathode 101 of the vacuum tube 79, is connected across the output conductors 80 and 81. The series arm of the filter 307 is shown connected to the control grid 205 of the vacuum tube 203 of the amplifier 41. A blocking condenser 208 may be interposed. A resistor 209, connected between the anode 204 and the cathode 206 of the vacuum tube 204, is connected across the output conductors 73 and 74.

The attenuation or suppression is under the control of a control circuit 6. The control circuit 6 is of such nature as to produce no noticeable effect upon the quality of the reproduction. The input side of the control circuit 6 is subjected to the action of the input signal from the signal source 19 through the medium of lead conductors 52 and 53 respectively connected to the input leads 50 and 51. The control circuit 6 is designed so as automatically to shift the response range of the controlled circuit 70.

The control circuit 6 is shown in Fig. 7 as comprising a series rectifier 89 for rectifying the signal, connected in the control-circuit-input lead 52, and a condenser 14 connected across the control-circuit-input leads 52 and 53. The condenser 14, which bypasses signal voltages between conductors 23 and 24, may be located in associated circuits. The resistance of the rectifier 9 and the capacitance of the condenser 14 provide an R–C filter circuit for reducing the high-frequency components of the rectified signal voltage. A leak resistor 13 is connected in parallel with the capacitance 14. The rectified voltage of the control circuit 6 varies in accordance with the amplitude of the signal applied to the input terminals 15 and 16. Additional filtering may be added in the lead conductors 23 and 24, connecting the control circuit 6 to the variable amplifier 41, or additional amplification in the leads 52 and 53, if desired.

In the systems of Figs. 8 and 9 the rectifier 89 is shown connected in parallel with the parallel-connected condenser 14 and resistor 13. A further series arm comprising a resistor 91 and shunt arm comprising a capacitor 92 is also shown provided in the system of Fig. 9. A further such control circuit 106 is shown provided with similar elements having numerals augmented by 100.

The time constants of the rectifier 89 and the condenser 14 should be so chosen as to allow for rapid expansion of the high-frequency range without introducing spurious noises into the output circuit. The resistance of the leak resistor 13, on the other hand, should be relatively high in value, so that the response of the system should not contract suddenly, and thus accentuate vibrato or other musical effects. The system should contract at approximately the same rate as the decay of reverberation in normal music. Since the control voltage is obtained by rectifying the specified frequency components it is obviously a variable D. C. bias varying in accordance with the level of said components.

The output of the control circuit 6 is shown connected, in Fig. 7, by the conductor 24 to the cathode 206 of the vacuum tube 203 of the variable amplifier 41 and, by the conductor 23, to a further control grid 103. In the systems of Figs. 8 and 9, however, the connection of the conductor 23 is shown to the control grid 205, through a resistor 12. The grid bias thus developed in the system of the control circuit 6 is therefore transmitted by the leads 23 and 24 to the variable amplifier 41 to impress and adjustable control voltage from the output of the control circuit 6 upon the grid 103.

The adjustments are such that the control circuit 6 automatically adjusts the system so as to attenuate all frequency components of the input signal above a predetermined value, such as 2,500 cycles, at low-volume or low-intensity levels of the signal, or predetermined ranges of the signal. The spurious noises accompanying the high-frequency components are thus eliminated at low-volume levels with a minimum effect upon the tone quality. The system thus adjusts itself automatically to the signal to be transmitted.

The characteristics of the control circuit 6 should be so selected for each range as to insure the best performance with the intended type of signal.

A filter network 7 may be inserted in the lead conductors 52 and 53, in the input circuit of the control circuit 6, to vary the response of the controlled circuit 6 with frequency. The filter 7 may comprise a series resistor 21 (Fig. 7) or inductor 121 (Fig. 8) and a shunt capacitor 22, and also, as shown in Fig. 9, additional elements. The function of the filter 7 is to prevent the control circuit 6 from operating on signals in the eliminated range of frequencies and may approximate the sensitivity characteristics of the ear. This is necessary when the applied signal may have strong high-frequency or low-frequency noise components occurring at levels higher than the desired components. An amplifier 100 may also be inserted in these leads 52 and 53 to increase the magnitude or the effectiveness of the control voltage. A filter (not shown) may also be added in the output leads 36 and 56 of the control circuit 6 shown in Fig. 6, if desired.

The control circuit 6, which controls the transmission of the amplifier 41, is thus actuated by signals obtained through filter 7. The purpose of this and similar filters is to reduce the sensitivity of the control means in the frequency ranges being controlled, thus to prevent the transmission of high-level noise in those ranges.

As illustrated in Fig. 6, however, a result similar to that obtained with the aid of the filter 7 may be obtained without employing the filter 7. The leads 52 and 53 are shown in Fig. 6 connected to the output terminals 17 and 18, as indicated by the leads 36 and 56. The control voltage is then derived, not from the input, but from the output voltage of the system, under the control of the output signal, at the output level. It may also be derived from a voltage at any point intermediate between the input and the output terminals, depending upon the type of control characteristics desired, as will later be described in connection with Fig. 9. The terminals 15 and 16 may represent the input and the terminals 17 and 18 the output, or vice versa.

When the control is from the output circuit, the system can expand in frequency range only in the presence of strong signals in the range not controlled. It may contract, however, only when all of the signal components decrease in amplitude. While this operation is not identical with control by the input circuit, through the filter 7, it is similar in that high-level noise in the controlled range cannot cause the system to expand. If, however, a filter 7 is added to the leads 36 and 56, the operation will be similar to that of the system of Fig. 5.

The control of the control circuit 6, actuated, as before described, in accordance with the amplitude of the applied signal, is such as to permit the restricted-range amplifier 40 to operate only at low levels, and both amplifiers to operate at high levels. The overall response of the system will thus vary with the level of the applied signal. Those frequencies only will tend to be included that are necessary for satisfactory reproduction of the signal at the volume level existing at any particular moment. At low-volume levels, therefore, the restricted-range amplifier 40 is alone in operation. The high-frequency components, with their accompanying noises, are eliminated by reason of the inoperability of the amplifier 41, at this time, to transmit them.

The low frequencies may be similarly controlled. When both the high and the low frequencies are controlled, or when the filters associated with the low-level amplifiers have resonant cut-off characteristics, substantially constant aural balance may be maintained as described in copending applications, Serial Nos. 641,673, 642,411 and 642,412, respectively filed January 17, 1946, January 19, 1946, and January 19, 1946.

The circuit of Fig. 8 offers an illustration of the use of band-pass and band-elimination filters for controlling both the high and the low frequencies, while maintaining balance. The range of the fixed amplifier 40 may be restricted by the band-pass filter 207 comprising, as before explained, a series inductor 78 connected in series with a condenser 178, and a shunt capacitor 45 connected in parallel with an inductor 145. Medium frequencies may be eliminated from the variable-gain amplifier 41 by the band-elimination filter 307, comprising, in this case, as already explained, a series capacitor 46, connected in parallel with an inductor 146, and a shunt inductor 47, connected in series with a condenser 147. This filter 307 may be connected in any desired manner, to the input circuit of the vacuum tube 203 of the amplifier 41.

The controlled circuit 70, therefore, may be designed to pass normally only a restricted range of frequencies at low-volume levels. This may be expanded to the full range that it is desirable to transmit at high-volume levels; say, from about 70 to about 12,000 cycles, or from about 90 to about 8,000 or more cycles, or any other range, depending upon the application and the limitations of associated equipment. The controlled circuit 70 may also be designed so that it shall be able to attenuate or completely suppress, at low-volume levels, in predetermined ratio, the higher and lower ranges of frequencies; say, the high-frequency components above about 2,500 cycles, and the low-frequency components below about 250 cycles, or some similar values, depending upon the application and other factors.

The fixed-type amplifier 40, therefore, transmits, as a unit, one or two of the three types of frequency components heretofore described as high, medium, and low. The variable-type amplifier 41 transmits the other one or two types as a unit. The control is such that that unit is reduce dthat does not contain the medium-frequency components. This is effected when the level of the medium-frequency components or the low-frequency components or both falls below the predetermined volume or intensity level; or when the level of the signals falls below the predetermined value if the signals are of such character that the level of the low-frequency components is high compared to the level of the high-frequency components.

Preferably, as in the system of Fig. 8, the fixed-gain amplifier 40 will transmit the medium-frequency components only, and the variable-type amplifier will transmit, as a unit, both the high-frequency and the low-frequency components. This effects control of both the high- and the low-frequency noises, and also allows maintenance of the balance between the high and the low frequencies under all conditions.

These control circuits are interchangeable and may be used in the systems of any of the figures, with or without extra amplifiers or filters.

According to the system of Fig. 3, both amplifiers 75 and 42 are variable. The fixed amplifier 40 of Figs. 2, 7, and 8 is replaced by the variable-gain amplifier 75, having a narrow range, representing only the minimum range required for low-volume-level reproduction. It may provide for increase in amplification in a portion of this range, as by means of a resonant filter, thus intensifying certain frequency ranges when others are attenuated. As previously mentioned in connection with Fig. 7, the filter 207 may have resonant characteristics accentuating a band of frequencies in the neighborhood of cut-off. For this particular filter such resonance can be obtained when the impedance across leads 50 and 51 is relatively low, or the output impedance across capacitor 45 is relatively low with respect to the normal terminating impedance for a filter of this type. This would improve balance. The variable-gain amplifier 41 is replaced by the variable-gain amplifier 42, though without the filter 307. The amplifier 41 has a wide range, operating at high-volume levels, for transmitting the entire range of frequencies that are desirable for high-level reproduction. The control circuit 6 is connected to the variable amplifier 42 in the same way as to the variable amplifier 41 of Figs. 2 and 7. The control circuit 6 is connected also, however, to the variable-gain amplifier 75 by corresponding separate control-output conductors 76 and 77.

The filter 7 (if employed) and the control circuit 6 turn on the wide-range amplifier 42 in the same manner that they turn on the amplifier 41 of Fig. 7. They turn off the narrow-range amplifier 75 through the control-output-connecting conductors 76 and 77, when the signal contains strong frequency components within the range of the narrow-range amplifier 75. At low-volume or low-intensity levels, therefore, the restricted range of the amplifier 75 will reduce or attenuate the high-frequency components. At the high levels, the amplifier 75 will become substantially ineffective, and the wide-range amplifier 42 will then alone function. The combined frequency characteristics of the two amplifiers 75 and 42, under these conditions, should be such as to provide the desired overall response at any particular intermediate level. In the system of Fig. 3, therefore, the control circuit 6 renders one of the amplifiers 75 and 42 substantially ineffective when the other is effective, and vice versa.

The filter 7 insures that the control shall be in accordance with signals in the narrow range. In the system of Fig. 3, too, under certain circumstances, the filter 7 may be eliminated, or the control circuit 6 may be actuated from the output of the narrow-range amplifier 75.

The main advantage of the system of Fig. 3 over that of Fig. 2 is that the narrow range may contain a certain amount of resonance, thus improving the reproduction in the neighborhood of the cut-off frequency at low levels. Such resonance, however, is undesirable at high levels, under which conditions the amplifier 75 is essentially turned off.

Fig. 11 illustrates typical circuit configurations applicable to Fig. 3. The filter 207, comprising inductors 78 and 145 and capacitors 178 and 45, is a band pass filter transmitting only the narrow range required at low levels to amplifier 75. The constants of this filter may be so chosen as to provide a certain degree of resonance in the region of cutoff. Similarly, other circuit configurations, including resistance-capacitance and resistance-inductance filters may be used.

The amplifier 42, on the other hand, transmits a relatively wide range. Both amplifiers are under control of the control circuit 6 so that when amplifier 75 is transmitting the full level, amplifier 42 is substantially cut off and vice-versa. Under intermediate conditions, both amplifiers provide partial transmission. For the sake of variety, filter 7 has been eliminated and control derived directly from the output of filter 207 through leads 84 and 85 as shown in Fig. 10. Filter 7 may, however, be used and may typically comprise a configuration such as filter 207 or such as the filter 7 in Fig. 9. Preferably, filter 7 should restrict the control to essentially the range transmitted through filter 207.

The control circuit 6 is similar to the combined control circuits 6 and 106 of Fig. 9 except that the rectifiers 89 and 189 are series- rather than parallel-connected for the sake of variety. Rectifier 89 produces a negative voltage across condenser 14 and resistor 13 in accordance with the signal applied through leads 84 and 85. This voltage is filtered by resistor 91 and condenser 92 and applied between the grid 305 and the cathode 306 of vacuum tube 303 in amplifier 75 through leads 76 and 77. Similarly the other half of the control circuit, with numerals augmented by 100, applies a positive bias in accordance with the signal to the grid 405 of tube 403 through leads 23 and 24. Thus one amplifier is turned on when the other is turned off and vice-versa.

Alternative arrangements or adjustment of the circuit values of filter 207 will allow filter 207 to function substantially as a low-pass or a high-pass filter when only one end of the frequency range is to be controlled. In general, the preferred versions of the circuit has filter 7, if used, operating in the same general frequency range as filter 207.

It is also possible to reduce the frequency range by phase reversal. The amplifier 40 of Fig. 2, for example, may have a wide range, and the output of the amplifier 41 may have a narrow range, reversed in phase, so as to reduce the overall range of the system. A variable-$\mu$ tube or other variable amplifier, moreover, may be used in the feed-back circuits of amplifiers (not shown) using feed-back, thus controlling the gain by controlling the feed-back.

The system of Fig. 10 embodies the fixed amplifier 40 and the variable amplifier 41 of Fig. 2, with their respectively associated band-pass and high-pass filters 207 and 307, under the control of the control circuit 6, with its asosciated filter 7, though the control exercised by the control circuit 6 is of a modified rating. A further variable-gain amplifier 142, however, is connected in parallel with the amplifiers 40 and 41, in series with an associated filter 407, and controlled by a further control circuit 86. To this end, the control circuit 86 is shown connected to the amplifier 142 by conductors 67 and 83, and to a point between the amplifier 40 and the filter 207 by conductors 84 and 85 as a further variant on the connections of Figs. 4, 5, and 6.

Three transmission paths or channels are thus provided, several with separate control circuits 6 and 86. The low, medium, and the high frequencies are reproduced through these separate channels. The amplifiers 142 and 41 are substantially ineffective at low levels. The channel provided by the amplifier 40 is substantially that required for low-volume-level reproduction. The two channels provided by the amplifiers 41 and 142, when operating, extend the range to that required for satisfactory high-volume-level reproduction. The amplifier 142 and its associated low-pass filter 407 may transmit the extra low frequencies required for high-level reproduction and the amplifier 41 the extra high frequencies, or vice versa. As the low-frequency and the high-frequency channels are ineffective at low-volume levels, such as are represented by the curve 4 of Fig. 1, the range is restricted to that of the medium-frequency channel 40, thus reducing transmission at frequencies above and below predetermined values.

Two methods of control are provided in the system of Fig. 10. There is first the control represented by the system of Fig. 5, resulting from the location of the filter 7 in association with the control circuit 6. Secondly, the control circuit 86 provides operation somewhat similar to that of the system of Fig. 6, but with control from a point intermediate between the filter 207 and the amplifier 40, rather than from the output, as shown in Fig. 6.

The control circuit 86 is controlled from the output of the filter 207, in the fixed channel. Control is thus obtained from a point between the input and the output circuits of this channel, thus eliminating any need for a special filter like 7.

In practice, either the amplifier 142 or the amplifier 41 may transmit the high frequencies and the other the low. Either amplifier may be controlled from the input, the output, or some intermediate point in this system. So long as the reproduction of the high and low frequencies is maintained in a predetermined relationship, aural balance may be maintained as described in the said application, Serial No. 642,411.

Though optimum operating conditions are provided by the system of Fig. 10, the adjustable paths or channels could, of course, be controlled from a single control circuit, as in the systems of Figs. 7 and 8.

The system of Fig. 10 has the advantage over the systems shown in Figs. 2, 3, and 8 in that the high-frequency channel may be controlled more rapidly than the low-frequency channel, thus to improve the reproduction of high-frequency transients.

The variable amplifiers may be combined with the variable filters described in the said applications, Serial Nos. 641,673, 642,411, and 642,412.

According to the system shown in Fig. 9, the fixed filter 207 and the amplifier 40 of Figs. 2, 7, and 8 are replaced by a variable band-pass filter 169, under the control of a separate control circuit 106. The variable band-pass filter 169 comprises a series arm containing an inductor 10, connected in the input lead 50, and tuned by means of a parallel-connected capacitor 38 to provide a parallel-resonant circuit. This provides a corresponding fixed point of high or substantially infinite attenuation above the cut-off of the normal transmission range, where the capacitor 38 resonates with the inductor 10. The band-pass filter comprises also a separate arm, connected across the output leads 80 and 81, and comprising a second inductor 34, connected in series with a conductor 25, leading from the output conductor 80, and therefore in series with the variable reactance of a reactance tube 8, provided with a feed-back network comprising a condenser 11 between its anode or plate 54 and its control-grid electrode 55. The anode 54 and the condenser 11 are connected in parallel to the output lead 80 by the conductor 85, through a capacitor 35 and the inductor 34, and the cathode 57 of the tube 8 is connected to the input lead 51 and the output lead 81 by a conductor 58.

A series-resonant circuit is thus formed with the simulated capacitance of the reactance tube 8. This provides a point of high attenuation which may be just above the cut-off frequency and variable with the cut-off frequency. An extremely sharp cut-off becomes thereby assured.

A condenser 102 may be connected across the input circuit of the filter 109, in shunt to an impedance 103. A condenser 250, connected in series with the conductor 50, between the input terminal 15 and the condenser 102, reduces transmission at low frequencies. The circuit, therefore, functions as a double-m-derived filter with a sharp high-frequency cut-off characteristic.

The fixed point of high attenuation should generally be placed above the normal-operating range. For reproducing ordinary shellac phonograph records, which contain frequencies up to approximately 8,000 cycles, 9,000 cycles is a good value for this purpose. If the system is to be used also for the reception of amplitude-modulated radio broadcasts, 10,000 cycles, which is the difference between adjacent channels, is a desirable value, as the 10,000-cycle attenuation will reduce also the heterodyne whistles. For program sources involving higher frequencies, of course, this fixed attenuation point may be set at a still higher frequency.

The variable filter 169 passes the medium-frequency range and as much of the lower frequencies as is required for low-level reproduction. At high levels, the filter 169 passes also the high frequencies, and the variable amplifier 41 also transmits, thus extending the low-frequency range. The filter 307, in this case of the simple R-C type, connected with the amplifier 41, restricts its range to the low frequencies.

The control circuit 6 is shown controlling the filter 169 and the control circuit 106 the amplifier 41. The conductor 23 is connected to the control electrode 55 through the resistor 12, and the conductor 24 is connected to the cathode 57.

The adjustments are such that the control circuit 6 automatically adjusts the cut-off frequency of the filter 169 so as to attenuate all frequency components of the input signal above a predetermined value, such as 2,500 cycles, at low-volume or low-intensity levels of the signal, or predetermined ranges of the signal. The spurious noises accompanying the high-frequency components are thus eliminated at low-volume levels with a minimum effect upon the tone quality. The system thus adjusts itself automatically to the signal to be transmitted.

It is generally desirable to obtain the system shift from narrow-range to wide-range reproduction at a high rate of speed. This is a particular advantage of the type of variable filter 169 depicted, as has been more fully explained in the said application, Serial No. 641,673. A predetermined degree of resonance may also be introduced into the filter, as disclosed in the said application, to provide improved aural balance. Both of these characteristics may be improved by operating the filter from a low-source impedance, or by keeping the impedance 103 at a relatively low value.

The filter 7 shown in Fig. 9 may be made, in connection with the control circuits, to approximate the characteristics of the ear, the low frequencies being attenuated by a series capacitor 197 and the high frequencies by the shunt capacitor 22. A shunt resistor 121 is connected between the capacitor 197 and the resistor 21. The various filters 7 may be used interchangeably in the various figures, or equivalent circuits may be used. The amplifier 100 may be used to increase the sensitivity of the control.

Essentially similar results, therefore, so far as steady-state conditions at low and high levels are concerned, may be obtained with either variable filters or variable amplifiers.

There is one important distinction between the operation of variable filters, as characterized by the system of Fig. 9, and the operation of variable amplifiers or variable filters in which resistive elements are varied as described in said copending applications. In a filter such as is illustrated in Fig. 9, either with or without points of high attenuation, the variation takes the form of a variation of cut-out frequency, maintaining reasonably constant transmission up to the cut-off frequency, and rapidly increasing attenuation above that frequency. With variable amplifiers, or with filters employing variable resistance, the cut-off frequency remains substantially fixed, and the change in the all-over transmission characteristics is accompanied merely by varying the attenuation above the cut-off frequency. While both systems will operate in substantially the same manner at the extremely low and high levels, it is obvious that, at intermediate levels, the characteristics will be somewhat different.

The advantages of the present invention may thus be realized in several different general forms, typical examples of which have illustrated as utilizing either variable filters or fixed filters with variable-gain amplifiers. Choice between one or another form depends upon the type of signal to be reproduced, as well as upon other considerations. In some cases, a combination of the two types may be justified. Various combinations of fixed and variable filters and amplifiers also may be utilized, unbalanced or push-pull. A variable filter may be employed to control one range of frequencies, for instance, and a variable amplifier to control another range of frequencies, or vice versa.

It is also understood that tubes with various control electrodes may be utilized and that the signal and control voltages may be applied to the same or separate electrodes, or that other well known means such as current-controlled resistors or impedances may be used to vary the transmission of the various channels.

In accordance with usual conventions in the showing of vacuum-tube circuits, the well-known operating-voltage sources, like batteries, power supplies, voltage dividers, bias resistors, transformers, and the like, are not illustrated. It will also be understood that, in any practical system, it may be desirable to add amplification or attenuation, so that the best operating conditions may be obtained.

Further modifications will also occur to persons skilled in the art, and all such are considered to fall within the spirit and scope of the present invention, as defined in the appended claims.

What is claimed is:

1. An electric system for transmitting signals having three types of frequency components, namely, relatively-high-frequency components, relatively-low-frequency components, and components of medium frequency, the system having, in combination, means for transmitting two of the said types, means for transmitting the third type, one of the transmitting means for transmitting the medium-frequency components, the other transmitting means for transmitting the other-type components, said other transmitting means comprising an electron-discharge device having at least one control electrode controllable by a variable control bias thereby controlling the transmission through said electron-discharge device, means for applying the signals to be transmitted by said other transmitting means to a control electrode in said electron-discharge device to be transmitted by said electron-discharge device, and means controlled by said medium-frequency components to vary said control bias applied to a control electrode in said electron-discharge device to reduce the transmission in said electron-discharge device and consequently said other transmitting means when the level of said medium-frequency components falls below a predetermined value.

2. An electric system for transmitting signals having three types of frequency components, namely, relatively-high-frequency components, relatively low-frequency components, and components of medium frequency, the system having, in combination, means for transmitting two of the said types, means for transmitting the third type, one of the transmitting means transmitting the medium-frequency components substantially unchanged, the other transmitting means comprising an electron discharge device transmitting said other-type components controllable by a variable control bias thereby controlling said transmission of said other-type components, means for applying the signals to be transmitted by said other transmitting means to a control electrode in said electron-discharge device to be transmitted by said electron-discharge device, and means controlled by the signals in the transmitting means transmitting the medium-frequency components to vary the control bias applied to a control electrode in said electron-discharge device to reduce the transmission in said electron-discharge device and consequently said other transmitting means when said controlling signals fall below a predetermined value.

3. An electric system for transmitting signals having three types of frequency components, namely, relatively-high-frequency components, relatively-low-frequency components, and components of medium frequency, the system having, in combination, an amplifier for transmitting two of the said types, an amplifier for transmitting the third type, one of the said amplifiers transmitting the medium-frequency components, the other amplifier comprising an electron-discharge device transmitting said other-type components and having at least one control electrode controllable by a variable control bias and transmitting said other-type components under control of said control bias, and means for rendering the other amplifier ineffective when the level of the medium-frequency components falls below a predetermined value said means comprising rectifying means rectifying said medium frequency components, thereby providing a control bias and means for applying said control bias to said control electrode.

4. An electric system having, in combination, means for transmitting signals of relatively-medium-frequency components and means for transmitting signals of relatively-high-frequency components, said transmission of said relatively-high-frequency components being accomplished by means of an electron-discharge device having at least one control electrode, the transmission of said electron-discharge device being variable in response to a variable control bias applied to said control electrode, and means effective only when the level of the relatively-medium frequency components exceeds a predetermined value to control said control bias thereby controlling said electron-discharge device thereby to increase the transmission of the relatively-high-frequency components.

5. An electric system having, in combination, means for transmitting signals over a range of frequencies having a relatively-low limit and a relatively - high limit, and parallel - connected means controlled in accordance with the level of the signals within said frequency limits for transmitting additional signals at frequencies beyond the limits each of said transmitting means comprising a transmission channel having an input circuit and an output circuit, the input circuits of all of said transmitting means being connected in parallel and the output circuits of said transmitting means being connected in parallel.

6. An electric system having, in combination, means for transmitting unmodulated signals over a range of frequencies having a relatively-low limit and a relatively-high limit, parallel-connected normally ineffective means for transmitting signals at frequencies beyond one of the limits said normally ineffective means comprising an electron-discharge device having at least one control electrode controllable by a control bias and means controlled in accordance with the signals within said limits for varying said control bias thereby rendering the normally ineffective means effective each of said transmitting means comprising a transmission channel having an input circuit and an output circuit, the input circuits of all of said transmitting means being connected in parallel and the output circuits of said transmitting means being connected in parallel.

7. An electric system having, in combination, means for transmitting signals over a range of frequencies having a relatively-low limit and a relatively-high limit, and means for transmitting signals at additional frequencies beyond one of said limits, said means including an electron-discharge device for transmitting said additional frequencies and having at least one control electrode controllable in accordance with a variable control bias, said bias being controlled in accordance with the signals within said frequency limits for transmitting said additional frequencies at high signal levels within said frequency limits.

8. A system as defined in claim 7 in which said electron discharge device is of the variable-gain type.

HERMON H. SCOTT.

REFERENCES CITED

The following references are of record in the file of this patent:

UNITED STATES PATENTS

| Number | Name | Date |
|---|---|---|
| 1,979,035 | Hammond | Oct. 30, 1934 |
| 2,008,702 | Hammond | July 23, 1935 |
| 2,008,708 | Hammond | July 23, 1935 |
| 2,009,229 | Hammond | July 23, 1935 |
| 2,040,954 | Roberts | May 19, 1936 |
| 2,054,647 | Ballantine | Sept. 15, 1936 |
| 2,072,708 | Case | Mar. 2, 1937 |
| 2,241,581 | Boucke | May 13, 1941 |
| 2,243,921 | Rust et al. | June 3, 1941 |
| 2,379,720 | Koch | July 3, 1945 |